United States Patent [19]

Bleys et al.

[11] Patent Number: 5,591,779
[45] Date of Patent: Jan. 7, 1997

[54] PROCESS FOR MAKING FLEXIBLE FOAMS

[75] Inventors: Gerhard J. Bleys, Heverlee; Dirk Gerber, Grimbergen; Vivane G. J. Neyens, Scherpenheuvel, all of Belgium

[73] Assignee: Imperial Chemical Industries PLC, London, England

[21] Appl. No.: 560,858

[22] Filed: Nov. 20, 1995

Related U.S. Application Data

[63] Continuation-in-part of Ser. No. 463,588, Jun. 5, 1995, abandoned, and a continuation-in-part of Ser. No. 478,078, Jun. 7, 1995, abandoned.

[30] Foreign Application Priority Data

Nov. 22, 1994 [EP] European Pat. Off. ............... 94203401
May 12, 1995 [EP] European Pat. Off. ............... 95201245

[51] Int. Cl.⁶ ..................... C08G 8/32; C08G 8/10
[52] U.S. Cl. ............ 521/109.1; 521/137; 521/159; 521/174; 528/76; 528/77; 560/26
[58] Field of Search .................. 521/109.1, 137, 521/159, 174; 528/76, 77

[56] References Cited

U.S. PATENT DOCUMENTS

| | | | |
|---|---|---|---|
| 3,799,898 | 3/1974 | Lamplugh et al. | 260/2.5 |
| 3,861,993 | 1/1975 | Guthrie | 161/159 |
| 3,890,254 | 6/1975 | Guthrie | 260/2.5 |
| 3,903,232 | 9/1975 | Wood et al. | 264/157 |
| 4,137,200 | 1/1979 | Wood et al. | 521/159 |
| 4,160,076 | 7/1979 | Guthrie et al. | 521/159 |
| 4,182,827 | 1/1980 | Jones et al. | 528/60 |
| 4,266,043 | 5/1981 | Fuji et al. | 521/175 |
| 4,365,025 | 12/1982 | Murch et al. | 521/159 |
| 4,377,645 | 3/1983 | Guthrie et al. | 521/137 |
| 4,384,050 | 5/1983 | Guthrie | 521/137 |
| 4,384,051 | 5/1983 | Guthrie | 521/137 |
| 4,638,017 | 1/1987 | Larson et al. | 521/157 |
| 4,740,528 | 4/1988 | Garvey et al. | 521/128 |
| 4,828,542 | 5/1989 | Hermann | 604/3 |
| 4,985,467 | 1/1991 | Kelly et al. | 521/52 |
| 5,065,752 | 11/1991 | Sessions et al. | 128/156 |
| 5,296,518 | 3/1994 | Grasel et al. | 521/176 |
| 5,331,015 | 7/1994 | Desmarais et al. | 521/62 |

FOREIGN PATENT DOCUMENTS

| | | |
|---|---|---|
| 420515 | 4/1991 | European Pat. Off. . |
| 2260543 | 4/1993 | United Kingdom . |
| 94/29361 | 12/1994 | WIPO . |

*Primary Examiner*—Morton Foelak

[57] ABSTRACT

Process for preparing a flexible foam by reacting a prepolymer having an NCO value of 3–15% by weight, which is the reaction product obtained by reacting an excessive amount of a polyisocyanate with a polyether polyol or a mixture of such polyols, said polyol or mixture having an average nominal hydroxyl functionality of from 2 to 6, an average hydroxyl equivalent weight of from 500 to 5000 and an oxyethylene content of at least 50% by weight, with water, the amount of water being 15–500 parts by weight per 100 parts by weight of prepolymer, at the start of the reaction the temperature of the prepolymer being 10°–50° C. and the temperature of the water being 10°–50° C. higher than the temperature of the prepolymer and a process for preparing a flexible foam by reacting the above prepolymer with water in the presence of a superabsorbent polymer.

18 Claims, No Drawings

PROCESS FOR MAKING FLEXIBLE FOAMS

CROSS-REFERENCE TO RELATED APPLICATIONS

This application is a continuation-in-part of U.S. patent application Ser. No. 08/463,588 filed Jun. 5, 1995 and U.S. patent application Ser. No. 08/478,078, filed Jun. 7, 1995, both now abandoned.

The manufacture of polyurethane flexible foams by reacting organic polyisocyanates such as toluene diisocyanates (TDI) or diphenyl methane diisocyanates (MDI) with polyether polyols in conjunction with a foaming agent is well established. The polyethers are usually polyoxypropylene polyols derived from propylene oxide or poly(oxypropylene-oxyethylene) polyols derived from various combinations of propylene and ethylene oxides. Ethylene oxide tipped polyoxypropylene polyols wherein the oxyethylene groups constitute a minor proportion of the total oxyalkylene residues are particularly important because of their enhanced reactivity towards isocyanates.

Polyols having higher oxyethylene contents, for example 50% or more on a weight basis, are often employed as minor additives to ensure that the foams have an open-cell structure. The use of these polyethers at very high concentrations in conjunction with the usual isocyanates is not as usual because then, instead of having a cell-opening effect, they result in closed cell foam.

In co-pending application PCT/EP94/01659 it has been found that flexible foam having valuable properties can be successfully made from formulations containing high concentrations of polyols having high oxyethylene contents if substantially pure 4,4'-MDI or a derivative thereof is employed as the polyisocyanate, water being used as the blowing agent. The preparation of hydrophilic flexible foams has further been described in U.S. Pat. No. 4,137,200 and U.S. Pat. No. 4,828,542.

Surprisingly it has now been found that hydrophilic foams may be obtained when the prepolymer, made from a polyisocyanate and a polyol having a high oxyethylene content, and the water are used at different temperatures.

Thus according to the invention, there is provided a process for the preparation of flexible foams by reacting a prepolymer having an NCO value of 3–15% by weight, which is the reaction product obtained by reacting an excessive amount of a polyisocyanate with a polyether polyol or a mixture of such polyols, said polyol or mixture having an average nominal hydroxyl functionality of from 2 to 6 and preferably of from 2 to 4, an average hydroxyl equivalent weight of from 500 to 5000 and preferably from 1000 to 5000 and an oxyethylene content of at least 50% by weight, with water, the amount of water being 15–500 parts by weight per 100 parts by weight of prepolymer, characterised in that at the start of the reaction the temperature of the prepolymer is 10°–50° C., preferably 15°–30° C. and most preferably room temperature and the temperature of the water is 10°–50° C., preferably 20°–45° C. higher than the temperature of the prepolymer. The temperature of the water is 25°–90° C., preferably 40°–70° C., most preferably 55°–65° C.

A preferred embodiment of the invention is a method for the preparation of flexible polyurethane foams by reacting a prepolymer, having an NCO value of 3–10% by weight which is the reaction product obtained by reacting an excessive amount of a polyisocyanate containing at least 65, preferably at least 90, and more preferably at least 95% by weight of 4,4'-diphenyl methane diisocyanate or a variant thereof with a polyether polyol or a mixture of said polyols, said polyol or mixture having an average nominal hydroxyl functionality of from 2.5 to 3.5, an average hydroxyl equivalent weight of from 1000 to 3000, and an oxyethylene content of from 50 to 85% by weight, with water, the amount of water being 30–300 parts by weight per 100 parts by weight of prepolymer, characterised in that at the start of the reaction the temperature of the prepolymer is 10°–50° C., preferably 15°–30° C. and most preferably room temperature and the temperature of the water is 25°–90° C., preferably 40°–70° C. and most preferably 55°–65° C. and the temperature of the water is 10°–50° C., preferably 20°–45° C. higher than the temperature of the prepolymer.

Surprisingly it has been found that good quality hydrophilic flexible foams can be obtained having a low density and hardness while the density and the hardness of the foam become less or even hardly dependent upon the amount of water used than in case the prepolymer and the water are reacted while having both the same or a similar temperature at the start of the reaction. For the sake of convenience the word average in the present application is not further specified but refers to number average unless explicitly used otherwise.

Polyisocyanates used for preparing the prepolymer may be selected from aliphatic, cycloaliphatic and araliphatic polyisocyanates, especially diisocyanates, like hexamethylene diisocyanate, isophorone diisocyanate, cyclohexane-1, 4-diisocyanate, 4,4'-dicyclohexylmethane diisocyanate and m- and p- tetramethylxylylene diisocyanate, and in particular aromatic polyisocyanates like toluene diisocyanates (TDI), phenylene diisocyanates and most preferably methylene diphenylene diisocyanates (MDI) and its homologues having an isocyanate functionality of more than two, like crude MDI and polymeric MDI.

Preferred polyisocyanates are methylene diphenylene diisocyanates selected from pure 4,4'-MDI, isomeric mixtures of 4,4'-MDI and 2,4'-MDI and less than 10% by weight of 2,2'-MDI, and modified variants thereof containing carbodiimide, uretonimine, isocyanurate, urethane, allophanate, urea or biuret groups, like uretonimine and/or carbodiimide modified MDI having an NCO content of at least 25% by weight and urethane modified MDI obtained by reacting excess MDI and a low molecular weight polyol (MW up to 1000) and having an NCO content of at least 25% by weight. Mixtures of the isocyanates mentioned above may be used if desired. The polyisocyanate may contain dispersed urea particles and/or urethane particles prepared in a conventional way, e.g. by adding a minor amount of an isophorone diamine to the polyisocyanate.

The most preferred polyisocyanate used in preparing the prepolymer is a polyisocyanate containing at least 65%, preferably at least 90% and more preferably at least 95% by weight of 4,4'-diphenyl methane diisocyanate or a variant thereof. It may consist essentially of pure 4,4'-diphenyl methane diisocyanate or mixtures of that diisocyanate with one or more other organic polyisocyanates, especially other diphenyl methane diisocyanate isomers, for example the 2,4'-isomer optionally in conjunction with the 2,2'-isomer. The most preferred polyisocyanate may also be an MDI variant derived from a polyisocyanate composition containing at least 65% by weight of 4,4'-diphenylmethane diisocyanate. MDI variants are well known in the art and, for use in accordance with the invention, particularly include liquid products obtained by introducing uretonimine and/or carbodiimide groups into said polyisocyanates, such a carbodiimide and/or uretonimine modified polyisocyanate preferably having an NCO value of at least 25% by weight, and/or by reacting such a polyisocyanate with one or more polyols having a hydroxyl functionality of 2–6 and a molecular weight of 62–1000 so as to obtain a modified polyisocyanate, preferably having an NCO value of at least 25% by weight.

The polyether polyol or mixture of polyether polyols used in preparing the prepolymer preferably has an average nominal hydroxyl functionality of 2–4 and most preferably of 2.5–3.5 and an average hydroxyl equivalent weight of 1000–3000 and an oxyethylene content of from 50–85% by weight.

Polyether polyols include products obtained by the polymerisation of ethylene oxide optionally together with another cyclic oxide like tetrahydrofuran and—preferably—propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol and sorbitol. Mixtures of initiators may be used.

If another cyclic oxide is used the polyol may be obtained by the simultaneous or sequential addition of ethylene oxide and the other cyclic oxide as fully described in the prior art.

In order to obtain the preferred polyol having an average nominal hydroxyl functionality of 2.5 to 3.5 a polyol having a nominal hydroxyl functionality of 3 may be used or a mixture of polyols having an average nominal hydroxyl functionality of 2–6 provided the mixture is in the above 2.5–3.5 functionality range.

In general polyol mixtures may be used provided they have the required functionality, equivalent weight and oxyethylene content as described above.

The term "average nominal hydroxyl functionality" is used herein to indicate the average functionality (number of hydroxyl groups per molecule) of the polyol composition on the assumption that the average functionality of the polyoxyalkylene polyols present therein is identical with the average functionality (number of active hydrogen atoms per molecule) of the initiator(s) used in their preparation although in practice it will often be somewhat less because of some terminal unsaturation.

If desired, the polyether polyol or the mixture of polyols may contain dispersed polymer particles. Such polymer-modified polyols have been fully described in the prior art and include products obtained by the in situ polymerisation of one or more vinyl monomers, for example acrylonitrile and styrene, in polyoxyalkylene polyols or by the in situ reaction between a polyisocyanate and an amino- or hydroxy-functional compound, for example triethanolamine, in the polyoxyalkylene polyol.

The prepolymer is prepared conventionally by reacting the polyisocyanate and the polyol at relative amounts so as to obtain an NCO value of 3–15% by weight, preferably of 3–10% by weight at a temperature preferably between 40° and 90° C. The prepolymers so prepared are liquid at ambient conditions. To the prepolymer so prepared low amounts (up to 30% by weight) of further polyisocyanate and in particular MIDI may be added if desired. In order to improve the stability of the prepolymer an organic acid or Lewis acid may be added.

The prepolymer preferably has a viscosity of at most 10.000 mPa.s at 25° C.

In preparing the prepolymer it should be avoided that the isocyanate functionality of the polyisocyanate and the average nominal hydroxyl functionality of the polyol or mixture of polyols are both 2.0. If one of these functionalities is 2.0 the other one preferably is at least 2.2.

The prepolymer is reacted with water, the amount of water being 15–500, preferably 30–300, most preferably 40–250 parts by weight per 100 parts by weight of prepolymer.

The foam-forming reaction mixture may contain one or more of the additives used in preparing flexible foams. Such additives include catalysts, for example tertiary amines and tin compounds, surface-active agents and foam stabilisers, for example siloxane-oxyalkylene copolymers and polyoxyethylene/polyoxypropylene copolymers and polyoxyethylene polymers, chain extenders, for example low molecular weight diols or diamines, cross-linking agents, for example triethanolamine, glycerol and trimethylolpropane, flame retardants, organic and inorganic fillers, pigments, agents for suppressing the so-called boiling-foam effect like polydimethylsiloxanes, internal mould release agents, anticeptics, biocides and medicaments. However, valuable flexible foams may be obtained without any of these additives. Preferably no additives are applied except up to 10 parts and preferably up to 5 parts by weight of the aforementioned polyoxyethylene/polyoxypropylene copolymers and polyoxyethylene polymers per 100 parts by weight of prepolymer. If used, such additives preferably are pre-mixed with the water. As to the use of these (co)polymers it was surprisingly found that foams, which exhibit very good wicking properties and are able to absorb and retain water in an amount of several times the weight of the foam and/or which have reticulated cells, could be made when the prepolymer and the water are reacted in the presence of 0.01–10 parts by weight, per 100 parts by weight of prepolymer, of a polyol having an average molecular weight of 500–10000 and an average nominal hydroxyl functionality of 2–6, this polyol being a polyoxyethylene polymer or a polyoxyethylene polyoxypropylene block copolymer having an oxyethylene content of at least 30% by weight. This polyol preferably is used in an amount of 0.05–3 parts by weight per 100 parts by weight of prepolymer. These polyols are known in the art and commercially available. Examples are Synperonic™ PE L44, L64, F68, P75, P84, P85 and F87, all available from Imperial Chemical Industries PLC.

When these polyols are used the wicking properties are especially obtained when polyols are used having an oxyethylene content of 35–70 and more in particular 40–70% by weight; preferably the average nominal hydroxyl functionality of such polyols is 2. When these polyols are used the reticulated properties are especially obtained when polyols are used having an oxyethylene content of 70–100 and optimally 100% by weight; it is preferred to use at least 40 parts by weight of water per 100 parts by weight of prepolymer for preparing such reticulated foams.

Before the prepolymer and the water are reacted in the presence of this polyol, the water and this polyol preferably are premixed.

Further the process according to the present invention using water at a temperature higher than the prepolymer may be conducted in the presence of superabsorbent polymers as will be explained hereinafter in more detail. The types and amounts of superabsorbent polymers and the way they are used are described below.

This reaction system is used for making hydrophilic flexible foams, having good properties, in a very simple way.

The preferred prepolymers have a low viscosity which improves ease of handling and processing when making flexible foams which have a desirable colour (white), have open cells or are easy crushable and can have compression set values (ASTM D 3574-77, Test D, dry 50%) below 20% in particular when no surfactant is used. The purity and simplicity of the chemicals used for making the prepolymers ensures that flexible foams made thereof have a minimum of leachable substances which make these foams especially useful in areas where contact with a human body is required like in medical and hygienic applications.

The foams may be produced in the form of slabstock, mouldings and the like and may be used for vibration damping, diapers, sponges, wound dressings, tampons, cosmetic pads, drug release products, plant growth media, absorbent in food trays and the like.

Further the present invention is concerned with a process for preparing a hydrophilic flexible foam by reacting the prepolymer as defined before with 15–500 parts by weight of water per 100 parts by weight of prepolymer in the presence of a superabsorbent polymer.

Superabsorbent polymers (SAP) are widely known as such. SAP or water-absorbent polymers or hydrogels are water-insoluble hydrophilic polymers, able to swell and absorb amounts of water, saline solutions, physiological fluids or body fluids as high as 10–100 times their own weight. They consist of polyelectrolytes or other highly hydrophilic polymeric matrices, usually bearing crosslinking sites along the macromolecular chains in order to avoid dissolution. They may be natural SAPs, like guar gum, other natural gums and starches and, preferably, synthetic SAPs which include polymers based on acrylic or methacrylic acids, esters, nitriles, amides and salts therof, polysaccharides, maleic anhydride polymers, poly(vinyl) alcohol, poly(N-vinyl-pyrrolidone) and diallyl dialkyl quaternary ammonium salts. For an overview of SAP we refer to a review article "Water-Absorbent Polymers: A Patent Survey" of Riccardo PO in J.M.S—Rev. Macromol. Chem. Phys., C34 (4), 607–662 (1994). The superabsorbent polymers disclosed in this article may be used in the present invention.

SAPs based on acrylic or methacrylic monomers are polymers made by free radical polymerization of acrylic or methacrylic acids, esters, nitriles, amides and/or salts thereof optionally together with other unsaturated monomers like maleic, fumaric or itaconic derivatives, vinyl substituted sulfonic or ammonium salts, olefinic and styrenic monomers, hydroalkyl or alkyl acrylates and methacrylates, unsaturated sulfonic acid salts, acrylamidoalkyl sulfonic salts, vinyl sulfonate, styrene sulfonate, vinylbenzyl sulfonate, N,N'-methylenebisacrylamide, dialkylaminoalkyl acrylate and methacrylate, carbonyl containing heterocyclic N-vinyl monomers like N-vinyl-2-pyrrolidone, N-vinyl-2-caprolactam and N-vinyl-2-morpholinone. The polymers may be prepared by processes known in the art using if desired initiators, cross-linkers and surfactants as known in the art; see e.g. PO, pages 610–632. Cross-linking may be carried out by free radical copolymerization of small amounts of polyvinylic comonomers or by reaction of the pendent carboxylate or carboxylic groups of the polymer with a polyepoxide, a haloepoxide and/or a polyol.

Polysaccharide based superabsorbent polymers may be selected from e.g. starch graft copolymers and modified cellulose polymers. Such SAPs are obtained by grafting an unsaturated monomer like acrylonitrile, acrylic acid or acrylic amide onto a polysaccharide like starch or cellulose, optionally followed by saponification. Such polysaccharide based superabsorbent polymers are known in the art and may be prepared by processes known in the art; see PO, pages 632–638.

SAPs based on maleic anhydride polymers are made by reacting maleic anhydride and hydrophobic comonomers like an olefin or vinylether by processes known in the art; see PO, pages 638–642.

Further SAPs which may be used are polymers prepared by polymerizing diallyl dialkyl quaternary ammonium salts in the presence of a polyfunctional divinyl compound and/or a crosslinker like triallyl methylammonium chloride; polyalkylene oxides like polyethyleneoxide which have been cross-linked with e.g. formaldehyde and glutaraldehyde in the presence of sulphuric acid; poly(N-vinyl pyrrolidone) and poly(N-methyl, N-vinyl acetamide) which have been cross-linked by means of e.g. divinylbenzene, diacrylates or diethylene glycol divinylether. Such SAPs and the way they are made are known in the art; see PO, pages 642–647.

Preferred SAPs are selected from super absorbent polymers based on acrylic or methacrylic acids, esters, nitriles, amides and/or salts thereof; polysaccharide based superabsorbent polymers and superabsorbent polymers based on maleic anhydride.

SAP may be used in polyurethane foams. There exist three ways to incorporate SAP in polyurethane foam:

1. The ingredients for making the SAP and the ingredients for making the polyurethane foam are combined and the SAP and the polyurethane foam are allowed to be formed at the same time; see e.g. U.S. Pat. No. 4,731,391 and EP-163150. The result is an interpenetrating network. Disadvantage of this approach is that due to the presence of a relatively large number of reacting chemicals the process is cumbersome and difficult to control and that often monomers for the SAP preparation are used which are dangerous and toxic; this requires the flexible foam producer to take additional measures to protect the safety and health of its employees and the environment.
2. The SAP is incorporated in the polyurethane foam by impregnation using a liquid as a carrier for the SAP; see EP-41934. A disadvantage of this approach is that the preparation of the SAP containing foam requires a number of additional process steps which makes the process economically less attractive; further the cell size of the flexible foam needs to be bigger than the size of the swollen SAP particles which means a serious restriction as to the size of the SAP particles.
3. The SAP particles are mixed with the ingredients used for making the flexible foam.

EP-453286 discloses a superabsorbent foam material based on polyurethane foam and containing superabsorbent material. The superabsorbent material, which may be selected from the known ones, is mixed with conventional polyurethane formulations, which are then used to make a polyurethane foam. Such formulations contain a polyol, a catalyst, a polyisocyanate and a low amount of water.

U.S. Pat. No. 5,336,695 describes hydrophilic foams based on a polyurethane gel obtainable from a polyol, a diisocyanate, a superabsorbent, a catalyst and a low amount of water.

U.S. Pat. No. 4,201,846 discloses the use of a fiber made from a polymer of polyvinyl alcohol in a hydrophilic foam in order to reduce the swelling of the foam. The polyurethanes are made by reacting a prepolymer and water in the presence of the fiber and show improved tensile and tear properties and a reduced volume increase due to water absorption.

U.S. Pat. No. 3,900,030 discloses hydrophilic foams containing a finely divided, water-swellable polymer for use in tampons. The amount of polymer is critical in order to avoid leakage. The foams are made by reacting a mixture of the polymer and a polyol with a diisocyanate in the presence of a catalyst and a low amount of water.

U.S. Pat. No. 4,603,076 discloses the preparation of a hydrophilic foam by blowing an MDI-based prepolymer with a non-aqueous blowing agent and a polyoxyethylene polyol in the presence of a hydrophilic compound and a catalyst. The prepolymer is based on a mixture of MDI and polymeric MDI.

U.S. Pat. No. 4,985,467 discloses the preparation of hydrophilic foams by reacting a polyisocyanate, a polyol and water in the presence of a superabsorbent material followed by thermal reticulation.

EP-547765 and WO94/29361 disclose the preparation of flexible foams using a prepolymer, made from 4,4'-MDI and a polyether polyol having an oxyethylene content of 50–85% by weight, and water.

Surprisingly, we have found that hydrophilic flexible foams can be prepared using such superabsorbent polymers as discussed above by reacting a prepolymer as described above with high amounts of water in the presence of such a superabsorbent polymer (SAP). Such foams can be made without thermal reticulation.

The SAP may be premixed with the prepolymer, which makes the process very simple for the foam producer: only water needs to be added.

The foams are also attractive from an environmental point of view. Apart from the prepolymer, the SAP and the water no further additives are needed, in particular no catalysts.

The foams have very desirable properties: they exhibit limited skrinkage, have open-cells, are stable, do not show scorching and have very good water-absorbtion and water-retention characteristics, very good wicking properties and mechanical properties like tear strength (dry and wet) and elongation. Further the foams have a soft feel, provided no reticulated foams are made using the polymers and copolymers described before.

Consequently the present invention is further concerned with a process for preparing a flexible foam by reacting a prepolymer having an NCO value of 3–15% by weight, which is the reaction product obtained by reacting an excessive amount of a polyisocyanate with a polyether polyol or a mixture of such polyols, said polyol or mixture having an average nominal hydroxyl functionality of from 2 to 6 and preferably of from 2 to 4, an average hydroxyl equivalent weight of from 500 to 5000 and preferably of from 1000 to 5000 and an oxyethylene content of at least 50% by weight, with water, the amount of water being 15–500 parts by weight per 100 parts by weight of prepolymer, characterised in that the reaction of the prepolymer and the water is conducted in the presence of a superabsorbent polymer. Still further the present invention is concerned with a compositon comprising a prepolymer having an NCO value of 3–15% by weight, which is the reaction product obtained by reacting an excessive amount of a polyisocyanate with a polyether polyol or a mixture of such polyols, said polyol or mixture having an average nominal hydroxyl functionality of from 2 to 6, an average hydroxyl equivalent weight of from 1000 to 5000 and an oxyethylene content of at least 50% by weight and a superabsorbent polymer.

The amount of superabsorbent polymer used in general will be 1 to 100 parts by weight (pbw) per 100 parts by weight of prepolymer and more preferably 5 to 80 pbw and most preferably 10 to 70 pbw.

The prepolymers which may be used in this process according to the present invention and the way foams are made thereof are the same as those described above. The amounts of water used preferably are as described before.

In particular the foams preferably are made in the absence of the additives, especially catalysts, mentioned before with the exception of the polyoxyethylene polymers and polyoxyethylene/polyoxypropylene copolymers mentioned before.

When foams having particularly good wicking properties are desired or when foams showing reticulation are desired the same measures may be taken as described before.

The SAPs may be selected from those described in the article of PO as discussed before. More in particular they may be selected from cross-linked polyacrylates and polyacrylamides and the salts thereof. Such SAPs are commercially available; e.g. SANWET™ IM 3900G, IM 3746/1 and E394-95 from Hoechst/Cassella. Further SAPs may be selected from starch or cellulose grafted SAPs, using e.g. acrylonitrile, acrylic acid or acrylic amide as the unsaturated monomer. Such SAPs are also commercially available; e.g. SANWET IM7000 from Hoechst/Cassella.

Different SAPs may be used in combination. The SAPs may be mixed with the prepolymer and the water at the moment this prepolymer and water are mixed or the SAPs are premixed with the prepolymer. Preferably the SAPs are not premixed with the water. The mixing may be conducted by means of hand-mixing or normal machine mixing or under high shear mixing conditions.

Further the invention is concerned with absorbent articles, like diapers, sponges, wound dressings and tampons, comprising a catalyst-free, hydrophilic polyurethane flexible foam containing super-absorbent polymers. Preferably the foam is based on diphenyl methane diisocyanate. The invention is further illustrated by means of the following Examples.

EXAMPLE 1

Polyol 1 is a polyether (triol-initiated) having random oxyethylene and oxypropylene residues with a 77% oxyethylene content and a molecular weight of about 4000. A prepolymer was prepared by reacting 70 parts by weight of polyol 1 and 30 parts by weight of 4,4'-MDI. From this prepolymer a flexible foam was prepared by reacting it with varying amounts of water containing 0.4% by weight of Pluronic PE 6200 (an EO/PO surfactant from BASF-Pluronic is a trademark). The prepolymer had an NCO value of 7.85% by weight and a viscosity of 6000 mPa.s at 25° C. The temperature of the prepolymer was at room temperature (22° C.) prior to reaction. The amount and temperature of the water prior to reaction and the density and the hardness of the foams obtained is given in Table 1 below. Density and hardness were measured after drying the foam in an oven at 60° C. till no weight reduction was observed.

TABLE 1

| Experiment | 1* | 2* | 3* | 4* | 5 | 6 | 7 | 8 |
|---|---|---|---|---|---|---|---|---|
| Amount of water, pbw per 100 pbw of prepolymer | 30 | 110 | 30 | 110 | 30 | 110 | 30 | 110 |
| Temperature of water, °C. | 10 | 10 | 25 | 25 | 45 | 45 | 65 | 65 |
| Core Density, | 75 | 170 | 72 | 144 | 68 | 91 | 64 | 74 |

TABLE 1-continued

| Experiment | 1* | 2* | 3* | 4* | 5 | 6 | 7 | 8 |
|---|---|---|---|---|---|---|---|---|
| kg/m$^3$ | | | | | | | | |
| Hardness, CLD 40% (kPa) ISO 3386 | 9.1 | 17.1 | 7 | 14.5 | 5 | 6.4 | 3.6 | 4.3 |

*comparative experiments

EXAMPLE 2

The following Synperonic surfactants were used.

TABLE 2

| | EO content, % by weight | molecular weight |
|---|---|---|
| Synperonic PE L 43 | 30 | 1900 |
| L 44 | 40 | 2200 |
| L 64 | 40 | 2900 |
| P 84 | 40 | 4200 |
| P 85 | 50 | 4650 |
| F 87 | 70 | 7700 |
| F 38 | 80 | 4800 |

From 100 parts by weight of the prepolymer used in example 1 a flexible foam was prepared by reacting it with 70 parts by weight of water comprising 0.56 parts by weight of Synperonic polyol. The temperature of the prepolymer before the reaction was 22° C. The temperature of the water before the reaction, the type of Synperonic used and wicking results are given in Table 3.

TABLE 3

| Experiment | Synperonic PE type | Wicking test (seconds) | Water temperature (°C.) |
|---|---|---|---|
| 1 | L 43 | 53 | 45 |
| 2 | L 44 | 11 | 45 |
| 3 | L 64 | 8 | 45 |
| 4 | P 84 | 2 | 45 |
| 5 | P 85 | 1 | 45 |
| 6 | F 87 | 5 | 45 |
| 7 | F 38 | 130 | 45 |
| 8* | L 64 | 238 | 20 |
| 9* | P 84 | 254 | 20 |
| 10* | P 85 | 267 | 20 |

*comparative examples

The foams obtained in experiments 8–10 have predominantly closed cells.

Wicking test: a dry foam sample of size 9×9×1 cm is put on a water surface (one of the two large sides of the sample is put on the water) and the time is recorded until the upper face of the sample is visually wet completely.

Foams were made from the above prepolymer (100 pbw, at 22° C.), water and surfactant (0.8% by weight in the water). In Table 4 the amount (in pbw per 100 pbw of prepolymer) and the temperature of the water and the type of surfactant has been given together with an indication whether the foam obtained was a reticulated foam or not.

TABLE 4

| Experiment | Surfactant | Water amount | Water temperature, °C. | reticulated foam |
|---|---|---|---|---|
| 11* | G 26 | 70 | 25 | no |
| 12 | G 26 | 70 | 60 | yes, completely |
| 13 | F 68 | 70 | 80 | yes, completely |
| 14* | F 87 | 110 | 25 | no |
| 15 | F 87 | 110 | 45 | yes, majority of the cells |
| 16* | P 75 | 110 | 25 | no |
| 17 | P 75 | 110 | 45 | yes, minority of the cells |

*comparative experiments

G26 is a polyoxyethylene triol of molecular weight of 1200.

F68 is Synperonic PE F68: EO content 80% by weight and MW=8350.

P75 is Synperonic PE P75: EO content 50% by weight and MW=4150.

EXAMPLE 3

100 pbw of the prepolymer of example 1 was reacted with 70 pbw of water containing 0.8% by weight of Synperonic L64. The temperature of the prepolymer and the water before the reaction was room temperature (22° C.) and 45° C. respectively. Before the water and the prepolymer were combined and mixed SAP was added to the prepolymer and mixed. The type and amount (pbw per 100 pbw of prepolymer) of SAP used is given in Table 5, experiment 1–10 together with the results: the core density (kg/m$^3$) of the foam obtained was measured according to ASTM 3574/A; the maximal amount of 0.9% NaCl aqueous solution (physiological salt solution) which could be absorbed by the foam was determined (as grams of solution per dm$^3$ of foam); the amount of solution was measured which was retained when a pressure of 1 psi (4.5 kg/64 cm$^2$) was applied for 15 minutes on a foam containing the above determined amount of solution and is calculated according to the following formula:

$$100 - \frac{(A_m - A_p) \times 100}{A_m}, \%$$

wherein $A_m$ is the maximal amount of solution which the foam can absorb and $A_p$ is the amount of solution which remains in the foam after pressure was applied. The pressure was applied after allowing the foam to stand for 1, 10, 20 or 30 minutes. In Table 5 the retention figures are given for the optimal standing time(s).

The maximal absorption was determined by drying the foam for 24 h at room temperature, completely immersing the foam in the solution for 15 seconds, followed by taking the foam out of the solution and by determining the weight difference per dm$^3$ of the foam after and before immersing.

The above experiments were repeated using water at 22° C. The results are given in Table 5, experiments 11+12 (standing was 30 minutes).

TABLE 5

| Experiment | Type of SAP/ Amount of SAP | Maximal absorption, g/dm³ | Retention, %/optimal standing time(s), min | Core density, kg/m³ |
|---|---|---|---|---|
| 1 | — | 1370 | 53/1–30 | 65 |
| 2 | 1/15 | 1470 | 61/1–10 | 96 |
| 3 | 1/30 | 1350 | 57/1–10 | 99 |
| 4 | 1/50 | 1280 | 79/20 | 133 |
| 5 | 2/15 | 1240 | 67/10 | 90 |
| 6 | 2/30 | 1410 | 95/10 | 105 |
| 7 | 2/50 | 990 | 98/30 | 102 |
| 8 | 3/15 | 1480 | 64/10 | 80 |
| 9 | 3/30 | 1330 | 71/10 | 102 |
| 10 | 3/50 | 1250 | 99/10 | 128 |
| 11 | 1/50 (T water = 22° C.) | 1460 | 97 | 154 |
| 12 | 2/30 (T water = 22° C.) | 1360 | 94 | 124 |

SAP Type
1: Polyacrylamide-based SAP; Molecular weight of about $5.10^6$.
2: Starch-grafted sodium polyacrylate SANWET IM 7000.
3: Sodium polyacrylate SANWET IM 3900 G.

EXAMPLE 4

Example 3, experiment 4 was repeated with the proviso that the SAP was added in different ways. The cells of the foams obtained were visually inspected as to whether or not open celled foam was obtained and shrinkage of the foam was measured according to the formula:

$$\frac{(S_b - S_a) \times 100}{S_b}, \%$$

wherein $S_b$ is the diameter of the cup wherein the foam was made and $S_a$ is the diameter of the foam obtained after standing at room temperature for 12 hours.

The results are in Table 6, experiments 1–5.

TABLE 6

| Experiment | Addition of SAP | open-cells | shrinkage |
|---|---|---|---|
| 1 | to water, immediately followed by prepolymer | no | 18 |
| 2 | to water, followed by prepolymer addition after 150 seconds and add prepolymer | no | 65 |
| 3 | to prepolymer, immediately followed by water | yes | 14 |
| 4 | to prepolymer, followed by water addition after 150 seconds | yes | 13 |
| 5 | SAP, prepolymer and water are combined together | yes | 13 |
| 6 + 7 | to prepolymer, followed by water addition after 2 hours | yes | 13 |

Experiment 4 was repeated with the proviso that instead of after 150 seconds water was added after 2 hours and that SANWET IM 7000 and SANWET IM 3900 G were used in an amount of 30 pbw. The resuls are in Table 6, experiments 6+7.

EXAMPLE 5 (COMPARATIVE)

Example 3, experiment 3 was repeated with the proviso that 5 pbw of water was used. The foam collapsed.

We claim:
1. Process for preparing a flexible foam by reacting a prepolymer having an NCO value of 3–15% by weight, which is the reaction product obtained by reacting an excessive amount of a polyisocyanate with a polyether polyol or a mixture of such polyols, said polyol or mixture having an average nominal hydroxyl functionality of from 2 to 6, an average hydroxyl equivalent weight of from 500 to 5000 and an oxyethylene content of at least 50% by weight, with water, the amount of water being 15–500 parts by weight per 100 parts by weight of prepolymer, at the start of the reaction the temperature of the prepolymer being 10°–50° C. and the temperature of the water being 10°–50° C. higher than the temperature of the prepolymer.

2. Process for preparing a flexible foam according to claim 1, wherein at the start of the reaction the temperature of the water is 25°–90° C.

3. Process according to claim 1 wherein the temperature of the prepolymer is 15°–30° C., the temperature of the water is 40°–70° C. and the temperature of the water is 20°–45° C. higher than the temperature of the prepolymer.

4. Process according to claim 1 wherein the prepolymer is a prepolymer having an NCO value of 3–10% by weight which is the reaction product obtained by reacting an excessive amount of a polyisocyanate containing at least 65% by weight of 4,4'-diphenylmethane diisocyanate or a variant thereof and the polyol or mixture of polyols has an average nominal hydroxyl functionality of from 2.5 to 3.5, an average hydroxyl equivalent weight of from 1000 to 3000, and an oxyethylene content of from 50 to 85% by weight and the amount of water is 30–300 parts by weight per 100 parts by weight of prepolymer.

5. A process according to claim 1 wherein the reaction between the prepolymer and the water is conducted in the presence of 0.01–10 parts by weight, per 100 parts by weight of prepolymer, of a polyol (2) having an average molecular weight of 500–10000 and an average nominal hydroxyl functionality of 2–6, this polyol being a polyoxyethylene polymer or a polyoxyethylene polyoxypropylene block copolymer having an oxyethylene content of at least 30% by weight.

6. A process according to claim 5 wherein polyol (2) has an average nominal hydroxyl functionality of 2 and an oxyethylene content of 35–70% by weight.

7. A process according to claim 5 wherein polyol (2) has an oxyethylene content of at least 70% by weight and the amount of water used is at least 40 parts by weight per 100 parts by weight of prepolymer.

8. A process according to claim 1 wherein the reaction between the prepolymer and the water is carried out in the presence of a superabsorbent polymer.

9. A process according to claim 8 wherein the superabsorbent polymer is used in an amount of 10 to 70 parts by weight per 100 parts by weight of prepolymer.

10. A process according to claim 8 wherein the superabsorbent polymer is selected from super absorbent polymers based on acrylic or methacrylic acids, esters, nitriles, amides and/or salts thereof; polysaccharide based superabsorbent polymers and superabsorbent polymers based on maleic anhydride.

11. Process for preparing a flexible foam by reacting a prepolymer having an NCO value of 3–15% by weight, which is the reaction product obtained by reacting an excessive amount of a polyisocyanate with a polyether polyol or a mixture of such polyols, said polyol or mixture having an average nominal hydroxyl functionality of from 2 to 6, an average hydroxyl equivalent weight of from 500 to 5000 and an oxyethylene content of at least 50% by weight, with water, the amount of water being 15–500 parts by weight per 100 parts by weight of prepolymer, characterised in that the reaction of the prepolymer and the water is conducted in the presence of a superabsorbent polymer.

12. Process according to claim 11 wherein the prepolymer is a prepolymer having an NCO value of 3–10% by weight which is the reaction product obtained by reacting an excessive amount of a polyisocyanate containing at least 65% by weight of 4,4'-diphenyl methane diisocyanate or a variant thereof and the polyol or mixture of polyols has an average nominal hydroxyl functionality of from 2.5 to 3.5, an average hydroxyl equivalent weight of from 1000 to 3000, and an oxyethylene content of from 50 to 85% by weight and the amount of water is 30–300 parts by weight per 100 parts by weight of prepolymer.

13. A process according to claim 11 wherein the reaction between the prepolymer and the water is conducted in the presence of 0.01–10 parts by weight, per 100 parts by weight of prepolymer, of a polyol (2) having a number average molecular weight of 500–10000 and an average nominal hydroxyl functionality of 2–6, this polyol being a polyoxyethylene polymer or a polyoxyethylene polyoxypropylene block copolymer having an oxyethylene content of at least 30% by weight.

14. A process according to claim 13 wherein the amount of polyol (2) is 0.05–3 parts by weight per 100 parts by weight of prepolymer.

15. A process according to claim 13 wherein polyol (2) has a nominal hydroxyl functionality of 2 and an oxyethylene content of 35–70% by weight.

16. A process according to claim 13 wherein polyol (2) has an oxyethylene content of at least 70% by weight and the amount of water used is at least 40 parts by weight per 100 parts by weight of prepolymer.

17. A process according to claim 11 wherein the superabsorbent polymer is used in an amount of 10 to 70 parts by weight per 100 parts by weight of prepolymer.

18. A process according to claim 11 wherein the superabsorbent polymer is selected from superabsorbent polymers based on acrylic or methacrylic acids, esters, nitriles, amides and/or salts thereof; polysaccharide based superabsorbent polymers and superabsorbent polymers based on maleic anhydride.

* * * * *